3,485,753
HOT EXTRUSION OF METALS AND LUBRICANT
THEREFOR
Philippe Allais, Paris, France, assignor to Compagnie du Filage des Metaux et des Joints Curty (Cefilac), Paris, France, a corporation of France
No Drawing. Filed Apr. 8, 1965, Ser. No. 446,722
Claims priority, application France, May 29, 1964, 976,447; Dec. 30, 1964, 412
Int. Cl. C10m 5/00; B21c 23/32
U.S. Cl. 252—30          15 Claims

ABSTRACT OF THE DISCLOSURE

A method of lubricating metal workpieces employed in the hot extrusion of metals at a temperature in excess of 500° C. comprising applying a substantially uniform, thin layer of a mixture formed by dispersing a finely divided powder of glass material in a grease to the surfaces to be lubricated prior to extrusion. The glass material constitutes 5% to 50% by weight of the mixture and the grease is volatile or decomposible at or below the extrusion temperature.

---

This invention relates to methods and materials for lubricating metal workpieces employed in hot extrusion of metals at temperatures in excess of 500° C.

When extruding metals, for example steel, it is known to lubricate the flow of the metal along the container, and a mandrel for extrusion of hollow workpieces, with a glass or a glass-like material and this material may be a powder coating the outside lateral surface of the workpiece. In the case of a hollow workpiece, the material is interposed between the bore of the workpiece previously pierced and heated to extrusion temperature and the mandrel. Practical devices, such as a rolling table evenly coated with glass powder and a trough-shaped container not substantially longer than the billet, may be used to distribute the powder evenly along the length of cylindrical workpiece surfaces. But the glass is generally distributed among the various generatrices of the cylindrical surfaces by rotating the workpiece or billet about its axis as it rolls down the table. This method may lead to an uneven distribution in thickness of the powder over the billet. Since a minimum amount of lubricant over the surface of the billet is necessary, the total amount of powder to be used has to be so determined that the maximum surface density of the glass or glass-like material is higher than required. The excess of lubricant thus built up is generally not detrimental; however, it is desirable to avoid it in some cases.

My invention provides a method of extrusion and a lubricant holding mixture whereby this disadvantage is minimized or eliminated. More specifically my method relates to lubricating the container, and in the case of a hollow product the mandrel, of an extrusion press in the hot extrusion of metals which are extruded at temperatures higher than 500° C. The method comprises dispersing a finely divided powder of a glass or glass-like material as a suspension in a grease to form a mixture and, just before each extrusion, evenly spreading the mixture in a thin layer over the lateral surface of the extrusion container and/or the mandrel as the case may be.

The suspension of the powdered glass or glass-like material in grease is obtained in a homogeneous manner by any means which enables the rate of the suspension to be controlled (e.g. the weight percentage of lubricant in the mixture).

The grain size of the powder does not exceed between 5 and 10 microns when its weight percentage in the mixture amounts to roughly 10%. The grain size may be increased to 70 microns when the weight percentage of the powder is increased to 50% of the weight of the mixture. Preferably the grain size of the powder is between 3 and 70 microns.

The grease should be such as to give to the suspension a viscosity suitable for application upon and adherence to the container and/or to the mandrel at the temperature to which these tools have been cooled after a previous extrusion. Greases which are suitable include mineral, vegetable, animal as well as silicones provided that same are volatile or decompose at the temperatures at which hot extrusion is effected so that they are eliminated.

In addition, some colloidal graphite may be included in this grease.

When the container and the mandrel have been cooled, their lateral surfaces are coated with an even layer of the mixture. Then, the mandrel is inserted into the bore of the billet, previously heated to extrusion temperatures, and the latter is inserted into the container. This causes the grease to volatilize or burn, so that it and/or the products of its combustion are easily eliminated before upsetting the billet. Thus, when the extrusion begins, the container and the mandrel are separated from the billet by only a thin even layer of glass or of glass-like material, which ensures a good thermal insulation and a perfect lubrication during the whole extrusion.

The proportion of the powdered glass-like material incorporated into the grease may be between 5% and 50%, that of the colloidal graphite between 0 and 15% and that of both the graphite and the glass-like material between 5% and 65%, of the total weight of the mixture.

The surface density of the powdered material applied upon the mandrel and/or container surface can be controlled by selecting the percentage of glass or glass-like material to be incorporated into the grease, or by changing the thickness of the layer of mixture which is spread on the tool. This thickness preferably amounts to between 0.1 and 1.0 mm.

The surfaces of the bars and tubes produced in this manner are sound, and free both from seizings caused by an unsatisfactory lubrication and from gatherings of glass or glass-like material caused by an initial excess of lubricant.

An even layer of the mixture is particularly easily spread on the mandrel when the extrusion press is fitted with a mechanical device for uniformly rotating the mandrel round its axis.

The invention will now be more fully described with reference to the following examples:

EXAMPLE 1

A mixture was prepared and included a mineral grease in which was a suspension of 10% by weight of a glass-like material commonly used for the lubrication of the outside of the billets. This glass-like material was a powder whose grain-size was between 3 and 4 microns.

The mixture thus prepared was spread in a layer of even thickness amounting to 0.2 millimeter on a container and on a mandrel, which were part of a 1500 metric ton extrusion press. The container was 5.85 inches in diameter and the mandrel was 3.15 inches in diameter. A previously bored billet of carbon steel, heated to 1200° C. was extruded into a tube 3.47 inches in outside diameter and 0.16 inch in thickness.

The outside and inside surfaces of the tube were sound and free from any defect. This operation was repeated several times with the same satisfactory results and without the container and mandrel showing any wear.

EXAMPLE 2

The operation of Example 1 was repeated with the mixture prepared in the same way, but including an addition of 5% by weight of colloidal graphite. The same satisfactory results were achieved.

EXAMPLE 3

The operation of Example 2 was repeated with a mixture comprising 30% by weight of the glass-like material commonly used for the lubrication of the outside of the billet and 10% by weight of colloidal graphite. The balance was a mineral grease.

The glass-like material was a powder whose grain size was smaller than 50 microns. The container was 8 inches in diameter and the extruded tube was 2¼ inches in outside diameter and 5/16 inch in thickness.

The same satisfactory results were achieved.

While I have described preferred embodiments of my invention, it may be otherwise embodied within the scope of the appended claims.

I claim:

1. In a method for hot extruding a metal workpiece from a container through a die, the metal workpiece being extruded at temperatures in excess of 500° C. and the lateral surfaces of said container being lubricated by a glass material, the improvement comprising:
   (A) forming a mixture by dispersing a finely divided powder of said glass material in a grease to form a suspension of the powder in the grease, said glass material being 5% to 50% by weight of the mixture and the grease being eliminable at the hot extrusion temperatures; and
   (B) prior to extrusion applying a substantially uniform, thin layer of the mixture upon the interior lateral surfaces of the container, whereby the grease is eliminated at the extrusion temperature and the glass material lubricates the lateral surfaces of the container opposite the outer lateral surfaces of the workpiece.

2. The improvement of claim 1 wherein said layer of mixture has a thickness between 0.1 and 1.0 mm.

3. The improvement of claim 1 wherein the finely divided powder has a grain size between 3 and 70 microns.

4. The improvement of claim 1 wherein the mixture includes a suspension of colloidal graphite up to 15% by weight and wherein the glass material and the graphite comprise between 5% and 65% of the mixture by weight.

5. The improvement of claim 1 wherein the layer of mixtures is substantially 0.1 to 1.0 mm., the powder being of a grain size between 3 and 70 microns, the mixture including a suspension of colloidal graphite up to 15% by weight and wherein the glass material and graphite comprise between 5% and 65% of said mixture by weight.

6. In a method of hot extruding a hollow metal workpiece from a container therefor through a die by a mandrel that enters a hollow bore in the workpiece and the opening in the die during extrusion, the workpiece being extruded at a temperature in excess of 500° C. and the lateral surfaces of said container and said mandrel being lubricated by a glass material, the improvement comprising:
   (A) forming a mixture by dispersing a finely divided powder of said glass material in a grease to form a suspension of the powder in the grease, said glass material being 5% to 50% by weight of the mixture and the grease being eliminable at the hot extrusion temperatures; and
   (B) prior to extrusion applying a substantially uniform, thin layer of the mixture upon the outer peripheral surface of the mandrel, whereby the grease is eliminated at the extrusion temperature and the glass material lubricates the surface of the mandrel opposite the interior lateral surface of the hollow bore of the workpiece.

7. The improvement of claim 6 wherein a layer of the mixture is applied ot the interior lateral surface of the container opposite the outer lateral peripheral surface of the workpiece in a substantially uniform thickness.

8. The improvement claimed in claim 6 wherein the layer of mixture has a thickness of between 0.1 and 1.0 mm.

9. The improvement claimed in claim 6 wherein the finely divided powder has a grain size of between 3 and 70 microns.

10. The improvement claimed in claim 6 wherein the mixture includes a suspension of colloidal graphite up to 15% by weight and wherein the total amount of glass material and graphite comprise between 5% and 65% of the mixture by weight.

11. The improvement claimed in claim 6 wherein the layer of mixture is between 0.1 and 1.0 mm., the powder being of a grain size between 3 and 70 microns, the mixture including a suspension of colloidal graphite up to 15% by weight and wherein the glass material and graphite comprise between 5% and 50% of said mixture by weight.

12. A lubricating mixture for use in hot extrusion of metal workpieces at temperatures in excess of 500° C. comprising a grease that is one of volatile and decomposible at the hot extrusion temperatures and a suspension of finely divided powder of a glass material in said grease, the glass material comprising between 5% and 50% of said mixture by weight.

13. A lubricating mixture claimed in claim 12 including a suspension of colloidal graphite up to 15% by weight of said mixture and wherein the glass material and graphite comprise between 5% and 65% of said mixture by weight.

14. The lubricating mixture claimed in claim 12 wherein said finely divided powder has a grain size between 3 and 70 microns.

15. The lubricating mixture claimed in claim 13 wherein said finely divided powder has a grain size between 3 and 70 microns.

References Cited

UNITED STATES PATENTS

| | | | |
|---|---|---|---|
| 2,706,850 | 4/1955 | Sejournet et al. | 72—42 |
| 2,908,384 | 10/1959 | Capron et al. | 72—42 |
| 2,946,437 | 7/1960 | Edgecombe | 72—42 |
| 3,161,595 | 12/1964 | Fenker | 252—28 |

DANIEL E. WYMAN, Primary Examiner

I. VAUGHN, Assistant Examiner

U.S. Cl. X.R.

72—42; 252—28